(12) United States Patent
Karlsson

(10) Patent No.: US 7,395,943 B2
(45) Date of Patent: Jul. 8, 2008

(54) ARRANGEMENT FOR KEEPING CONTENTS WARM

(76) Inventor: Berit Euren Karlsson, Radarvagen 39, 183 61 Taby (SE)

( * ) Notice: Subject to any disclaimer, the term of this patent is extended or adjusted under 35 U.S.C. 154(b) by 772 days.

(21) Appl. No.: 10/878,854

(22) Filed: Jun. 28, 2004

(65) Prior Publication Data

US 2005/0029274 A1    Feb. 10, 2005

(51) Int. Cl.
*B65D 81/38* (2006.01)
*A47J 41/00* (2006.01)

(52) U.S. Cl. ............................. 220/592.24; 220/23.87
(58) Field of Classification Search ............. 220/23.87, 220/573.1, 573.3, 592.24, 737, 740, 912, 220/574.3; 383/37, 40, 110; 206/516; 190/26; 150/154, 164, 165, 901
See application file for complete search history.

(56) References Cited

U.S. PATENT DOCUMENTS

| 3,507,312 | A | * | 4/1970 | Petersen ..................... 220/737 |
| 5,465,654 | A | * | 11/1995 | Lampi et al. .................. 99/422 |
| 6,398,060 | B1 | * | 6/2002 | Apostolides ............. 220/573.1 |

* cited by examiner

*Primary Examiner*—Anthony D Stashick
*Assistant Examiner*—Harry A Grosso
(74) *Attorney, Agent, or Firm*—Rolf Fasth; Fasth Law Offices

(57) ABSTRACT

The invention relates to a container, such as a saucepan, pot, coffee pot or similar item, that is intended for keeping a content of the container (2) warm. The arrangement (1) has a container (2) that is enclosed by a heat insulating fabric part (3) that with the help of an adjustable band (18) is wrinkled at an upper part (5) around an area of an upper edge (6) of the container (2). This fixates the position of the fabric part (3) while at the same time providing a protection of the upper edge (6) of the container (2). An upper part (7) of the fabric part (3) is pivotably attachable to a heat insulating fabric part (9) that completely or partially encloses or covers a lid (8).

4 Claims, 1 Drawing Sheet

ARRANGEMENT FOR KEEPING CONTENTS WARM

PRIOR APPLICATION

This application is a U.S. national phase application claiming priority from Swedish Patent Application No. 0302163-1, filed 4 Aug. 2003.

TECHNICAL FIELD

The present invention related to an arrangement for maintaining warmth. More particularly, it relates to an arrangement for keeping contents of saucepan, pot, coffee pot and similar items warm.

BACKGROUND AND SUMMARY OF THE INVENTION

When food is served today, the contents of saucepans are often transferred to serving pots and put on the table. In this way, the food cools rapidly which leads to, after serving the food in portions, the food gets a temperature that makes the food less tasty. Alternatively, the item, such as saucepan, is put directly on the table but in certain circles this is not seen as polite and is therefore not recommended when guests are served.

The purpose of the present invention is to accomplish an arrangement with which one can place different saucepans, pots or similar items directly on the table so that they are clothed with a fabric pullover that hides the saucepan or the pot in question and therefore the actual saucepan or pot on the table is used while at the same time providing an effective maintenance of the warmth of the food. The distinguishing features of the present invention are outlined in the claims below.

Thanks to the invention, an arrangement is available for keeping the content of saucepan, pot, coffee pot or similar items warm. The arrangement fulfills its purpose in an effective way while at the same it is inexpensive and easy to manufacture. According to the arrangement of the present invention the contents of containers such as potatoes, rice, pasta, coffee, tea, etc. are kept warm partially by keeping the container warm when it is brought from the stove and no heat is lost when the content is poured to a serving pot that usually is only at room temperature and needs to be heated up. The serving pots often lack lids. By providing the container with the arrangement according to the invention the user saves on both dishes and time because only the container itself needs washing and no special serving pots are used. By using the arrangement of the present invention both the container and its content are hidden although the actual container is on the table and this is more evident if the warming arrangement is made of a fabric that is adapted to today's fashion and trends. It may perhaps also be adapted to table cloths, napkins and seat covers that are available on the market. Another advantage of the arrangement of the present invention is that it also protects the table and also the surrounding, such as persons and especially children, who otherwise can easily get burned and also when it is used on a lake. Furthermore, a container with a warm keeping arrangement according to the present invention is easier to move around on the table because it is attached to the actual container which an ordinary coaster or potholder does not do. Finally, the warm keeping arrangement of the present invention is washable which all coasters are not such as the most common cork coasters.

BRIEF DESCRIPTION OF THE DRAWINGS

The invention is described in more detail below with the help of a preferred example of an embodiment with reference to the appended drawings of which

DETAILED DESCRIPTION

Figure 1:
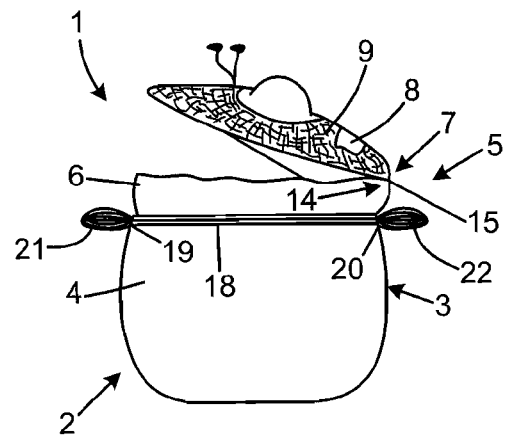
FIG. 1 shows an arrangement for keeping the contents warmth according to the present invention that is fixed on a container in the form of a pot, with two handles and a pivotable lid, that is placed in an enclosing fabric portion for heat insulation.
Figure 2A:
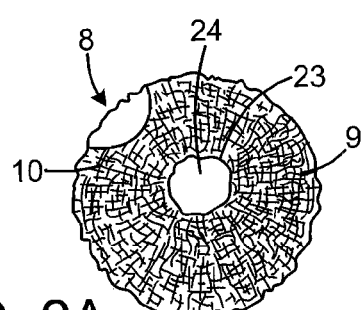
FIG. 2A is a top view of an upper part of the lid of the present invention.
Figure 2B:
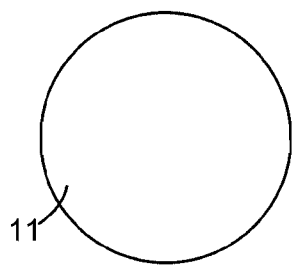
FIG. 2B is a bottom view of a lower part of the lid.
Figure 2C:
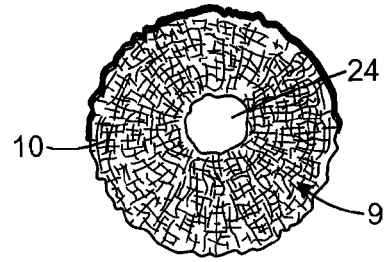
FIG. 2C is a top view of portions of a sewn fabric along half of a periphery that is intended to cover the lid.

As shown in the drawings a preferred embodiment of the arrangement is intended for keeping a content warm in a container 2 in the form of a saucepan, pot, coffeepot or similar items. The arrangement 1 includes a container 2 that is enclosed by a heat insulating fabric portion 3 in the form of a jacket 4 while a portion is provided with an upper edge 6 of the container 2. To fix the position of the jacket 4 at the upper edge 6 of the container, the jacket can include an adjustable band 18 such as a rubber band or a similar item. In an area at an upper portion 7 of the jacket 4 is a lid 8 pivotably attached that is completely or partially enclosed by a heat insulating fabric portion 9. The fabric portion 9 is intended to cover or enclose the lid 8. The lid 8 is disposed above the container 2.

The fabric portion 9 that encloses the lid 8 has an upper part 10 and a lower part 11. The upper part 10 is wrinkled at the outer edge 12 to cover the lid 8 and to keep this in place while the lower part 11 is flat and which parts are sewn together at a front portion 13 to a middle part to keep the lid 8 in place. The upper part 10 is further wrinkled at the edge to cover the lid and also for keeping this in place. The wrinkle 23 in the middle of the lid has a function of keep the handle 24 of the lid in place. The lower part 11 is flat and functions as an intermediary layer between the lid and the container to catch for example steam from the food such as potatoes and rice.

Figure 3A:
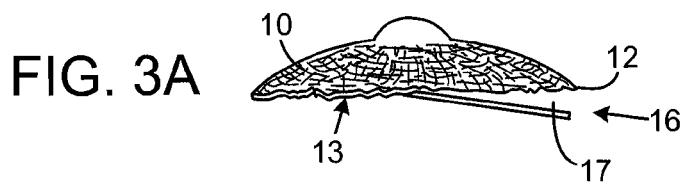
FIG. 3A is a side view of the lid of the present invention wherein an elongate opening is formed between the upper part and the lower part.
Figure 3B:
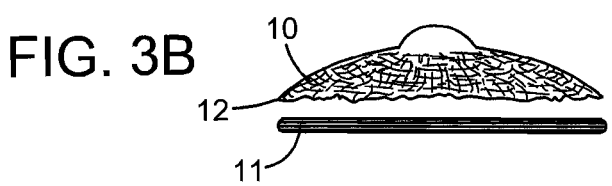
FIG. 3B is a side view of the lid of the present invention prior to the lower part being sewn together with the upper part.

As better shown in FIG. 3, both these parts, namely the upper part 10 and the lower part 11, are sewn together to form a pivotable part 15. This means that the lid is held in place when it is removed without having to set the lid aside and prevent that the lid gets lost. The fabric parts 10 and 11 that enclose the lid 8 has a rear edge 14 that together with the pivotable part 15 has an elongate opening 16 in the form of a slit 17 that is intended to be used when the lid 8 is removed or put in between the fabric parts 10 and 11. In the alternative, the inner part or the lower part 11 can in certain cases also be used as an intermediary layer is so designed such as for preventing the content of the container from getting dirty.

The jacket 4 that encloses the lid can be wrinkled at an upper part to be fixed in a position if the saucepan or the pot has an upper wrinkled head that is intended to protect the edge. The jacket 4 has at an upper part 5 a slit opening 19, 20 on each side for receiving a handle on a container or two ears 21, 22 of a container in the form of a pot.

Alternatively can also VELCRO® fasteners be used around the lid for fixating this by the jacket 4 around the actual container. In this way, it is advantageous to use at least two pieces so that the lid is held in place even though the entire arrangement is held together without permitting its content from getting out.

Alternatively can also Velcro fasteners be used around the lid for fixating this by the jacket 4 around the actual container. In this way, it is advantageous to use at least two pieces so that the lid is held in place even though the entire arrangement is held together without permitting its content from getting out.

The invention claimed is:

1. An arrangement of a container for holding a content of the container warm, comprising:
   a first heat insulating fabric part enclosing the container with an adjustable band disposed thereon, the insulating fabric part being wrinkled at an upper part around an upper edge of the container for fixing a position of the first heat insulating fabric part while at the same time providing a protection of the upper edge of the container,
   a lid disposed above the container,
   a second heat insulating fabric part completely or partially covering or enclosing the lid,
   the first heat insulating fabric part having a jacket covering both an outside and a bottom of the container,
   the second heat insulating part having an upper part and a lower part, the upper part of the second insulating part being wrinkled at an outer edge thereof to cover the lid to keep the lid in place, and
   the upper and lower parts that enclose the lid having a rear edge and a pivotable part that together with the first heat insulating fabric part form an opening in a form of a slit adapted for inserting the lid between or removing the lid from the upper and lower parts.

2. The arrangement according to patent claim 1 wherein the lower part is substantially flat and sewn together with the upper part.

3. The arrangement according to patent claim 1 wherein the adjustable band is a rubber band.

4. The arrangement according to patent claim 1 wherein the jacket that has an upper part that has a slit opening defined therein at each side for receiving a handle of the container in the form of a saucepan or two ears of a pot.

* * * * *